US012268240B2

(12) United States Patent
Thorsen et al.

(10) Patent No.: US 12,268,240 B2
(45) **Date of Patent: *Apr. 8, 2025**

(54) APPARATUS FOR RECEIVING SMOKABLE MATERIAL

(71) Applicant: Nicoventures Trading Limited, London (GB)

(72) Inventors: Mitchel Thorsen, Madison, WI (US); John Clayton Mehnert, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,971

(22) Filed: Aug. 12, 2021

(65) Prior Publication Data

US 2021/0368866 A1 Dec. 2, 2021

Related U.S. Application Data

(63) Continuation of application No. 16/099,309, filed as application No. PCT/EP2017/061523 on May 12, 2017, now Pat. No. 11,147,311.

(Continued)

(51) Int. Cl.
*A24F 47/00* (2020.01)
*A24F 40/46* (2020.01)
(Continued)

(52) U.S. Cl.
CPC ............. *A24F 40/46* (2020.01); *H05B 3/565* (2013.01); *A24F 40/20* (2020.01)

(58) Field of Classification Search
CPC ................................ A24F 40/40; A24F 40/46
See application file for complete search history.

(56) References Cited

U.S. PATENT DOCUMENTS

| | | |
|---|---|---|
| 3,599,646 A | 8/1971 | Berger et al. |
| 4,253,473 A | 3/1981 | Marmo et al. |

(Continued)

FOREIGN PATENT DOCUMENTS

| | | | |
|---|---|---|---|
| CL | 2017003355 A1 | 6/2018 | |
| CN | 101277622 A | 10/2008 | |

(Continued)

OTHER PUBLICATIONS

Chinese Search Report Received for Chinese Patent Application No. 201780022480.3, dated Jul. 8, 2021, 2 pages.

(Continued)

*Primary Examiner* — Eric Yaary
(74) *Attorney, Agent, or Firm* — Husch Blackwell

(57) ABSTRACT

An apparatus for receiving smokable material to enable at least one component of the smokable material to be volatilized is described. In an example, the apparatus comprises a housing having a first compartment and a second compartment. The first compartment is a heating compartment for receiving smokable material in use. The second compartment is an electronics compartment and containing at least one of control circuitry and a power source. The first compartment and the second compartment are substantially hermetically sealed from each other to minimize or prevent air or vapor flowing between the compartments.

7 Claims, 5 Drawing Sheets

Related U.S. Application Data

(60) Provisional application No. 62/336,284, filed on May 13, 2016.

(51) Int. Cl.
*H05B 3/56* (2006.01)
*A24F 40/20* (2020.01)

(56) References Cited

U.S. PATENT DOCUMENTS

| | | | |
|---|---|---|---|
| 4,955,399 A | 9/1990 | Potter et al. | |
| 5,954,979 A | 9/1999 | Counts et al. | |
| 6,158,530 A | 12/2000 | Bowen et al. | |
| 9,451,792 B1* | 9/2016 | Alima | A24F 40/485 |
| D843,052 S | 3/2019 | Powell et al. | |
| 2007/0074734 A1 | 4/2007 | Braunshteyn et al. | |
| 2007/0283972 A1 | 12/2007 | Monsees et al. | |
| 2008/0029110 A1 | 2/2008 | Dube et al. | |
| 2008/0163879 A1 | 7/2008 | Rodrigues et al. | |
| 2008/0302376 A1 | 12/2008 | Karles et al. | |
| 2010/0236561 A1 | 9/2010 | Barnes et al. | |
| 2013/0255702 A1* | 10/2013 | Griffith, Jr. | A24F 15/01 131/328 |
| 2014/0007863 A1 | 1/2014 | Zhiping | |
| 2014/0069444 A1 | 3/2014 | Cyphert et al. | |
| 2014/0216485 A1 | 8/2014 | Egoyants et al. | |
| 2014/0355969 A1 | 12/2014 | Joel | |
| 2015/0053214 A1 | 2/2015 | Alarcon et al. | |
| 2015/0189915 A1 | 7/2015 | Shuigen | |
| 2015/0189919 A1 | 7/2015 | Qiuming | |
| 2015/0201674 A1 | 7/2015 | Dooly et al. | |
| 2015/0208724 A1* | 7/2015 | Wu | A24F 40/60 131/329 |
| 2015/0208729 A1* | 7/2015 | Monsees | A61M 15/06 131/329 |
| 2015/0245658 A1 | 9/2015 | Worm et al. | |
| 2016/0007652 A1 | 1/2016 | Taluskie et al. | |
| 2016/0081395 A1 | 3/2016 | Thorens et al. | |
| 2016/0198771 A1 | 7/2016 | Goggin et al. | |
| 2016/0366937 A1 | 12/2016 | Qiuming | |
| 2017/0042227 A1* | 2/2017 | Gavrielov | A24F 40/51 |
| 2018/0161525 A1 | 6/2018 | Liu et al. | |
| 2018/0168224 A1 | 6/2018 | Naughton et al. | |
| 2019/0046745 A1 | 2/2019 | Nettenstrom et al. | |
| 2019/0246693 A1 | 8/2019 | Nettenstrom et al. | |
| 2022/0151297 A1 | 5/2022 | Brookbank | |
| 2023/0000135 A1 | 1/2023 | Rees et al. | |

FOREIGN PATENT DOCUMENTS

| | | | |
|---|---|---|---|
| CN | 101843368 | A | 9/2010 |
| CN | 102595943 | A | 7/2012 |
| CN | 203662020 | U | 6/2014 |
| CN | 104095293 | A | 10/2014 |
| CN | 203952426 | U | 11/2014 |
| CN | 104219973 | A | 12/2014 |
| CN | 204499486 | U | 7/2015 |
| CN | 104957779 | A | 10/2015 |
| CN | 105407748 | A | 3/2016 |
| CN | 105795503 | A | 7/2016 |
| DE | 19854005 | A1 | 5/2000 |
| EP | 2316286 | A1 | 5/2011 |
| EP | 2787846 | B1 | 3/2016 |
| JP | H07184627 | A | 7/1995 |
| JP | H08511176 | A | 11/1996 |
| JP | 2001521123 | A | 11/2001 |
| JP | 2003527127 | A | 9/2003 |
| JP | 2010506594 | A | 3/2010 |
| JP | 2013509160 | A | 3/2013 |
| JP | 2014522650 | A | 9/2014 |
| JP | 5670437 | B2 | 2/2015 |
| KR | 100404704 | B1 | 10/2004 |
| KR | 20120027029 | A | 3/2012 |
| KR | 20140068807 | A | 6/2014 |
| KR | 20150129683 | A | 11/2015 |
| KR | 20160031801 | A | 3/2016 |
| RU | 2600092 | C2 | 10/2016 |
| WO | 9748295 | A1 | 12/1997 |
| WO | 9920939 | A1 | 4/1999 |
| WO | 170054 | A1 | 9/2001 |
| WO | 2010047389 | A1 | 4/2010 |
| WO | 2010133342 | A1 | 11/2010 |
| WO | 2015097187 | A1 | 7/2015 |
| WO | 2015166245 | A2 | 11/2015 |
| WO | 2016207407 | A1 | 12/2016 |
| WO | 2017186946 | A1 | 11/2017 |
| WO | 2017194766 | A1 | 11/2017 |
| WO | 2017198874 | A1 | 11/2017 |

OTHER PUBLICATIONS

Communication pursuant to Article 94(3) EPC for Application No. 17726217.7, dated Nov. 17, 2020, 5 pages.
Communication pursuant to Article 94(3) EPC for Application No. 17726220.1, dated Oct. 8, 2020, 6 pages.
Decision of Refusal received for Japanese Patent Application No. 2018-551932, dated Jun. 22, 2021, 11 pages.
First Office Action received for Chinese Patent Application No. 201780028361.9, dated Aug. 14, 2020, 15 pages.
International Preliminary Report on Patentability for Application No. PCT/EP2017/061518, dated Aug. 17, 2018, 16 pages.
International Preliminary Report on Patentability for International Application No. PCT/EP2017/061523, dated Jul. 23, 2018, 14 pages.
International Search Report and Written Opinion for Application No. PCT/EP2017/061523, dated Sep. 11, 2017, 13 pages.
International Search Report for Application No. PCT/EP2017/061518, dated Aug. 1, 2017, 4 pages.
Notice Of Reason for Refusal for Japanese Patent Application No. 2018-551932, dated Oct. 6, 2020, 8 pages.
Office Action dated May 25, 2021 for Ukraine Application No. 201811040, 2 pages.
Office Action For Chinese Application No. 201780022480.3, dated Mar. 2, 2021, 6 pages.
Office Action For Korean Application No. 10-2018-7032766, dated Dec. 28, 2020, 10 pages.
Office Action dated Jan. 10, 2020 for Indian Application No. 201847042184, 5 pages.
Office Action dated Jan. 28, 2020 for Japanese Application No. 2018-551932, 6 pages.
Office Action dated Jun. 28, 2019 for Russian Application No. 2018139838, 5 pages.
Office Action dated Feb. 25, 2020 for Japanese Application No. 2018-554501, 12 pages.
Office Action received for Chinese Patent Application No. 201780022480.3, dated Jul. 8, 2021, 13 pages.
Office Action received for Korean Application No. 10-2018-7032766, dated Jun. 16, 2020, 10 pages.
Thorsen, Mitchel, Application and File History for U.S. Appl. No. 16/099,294, filed Nov. 6, 2018.
Communication pursuant to Article 94(3) EPC for Application No. 17726220.1, dated Dec. 23, 2021, 6 pages.
Decision to Grant a Patent received for Japanese Patent Application No. 2020-185086, dated Jun. 7, 2022, 5 pages (2 pages of English Translation and 3 pages of Official Copy).
GB Search Report for Application No. 1808526.6 date of search Nov. 14, 2018, 1 Page.
International Search Report and Written Opinion for Application No. PCT/EP2019/063501, dated Sep. 18, 2019, 13 pages.
Notice of Opposition received for Vietnam Application No. of 1-2018-04987, mailed on Nov. 25, 2019, 25 pages (Official Copy Only).
Notice of Reasons for Refusal for Japanese Application No. 2020-185086, dated Jan. 4, 2022, 8 pages (4 pages of English Translation and 4 pages of Official Copy).
Office action for Brazilian Application No. 112018072732-6, dated Sep. 28, 2021, 4 pages (Official Copy Only).

(56) References Cited

OTHER PUBLICATIONS

Office Action for Chinese Application No. 201780022480.3, dated Feb. 10, 2022, 7 Pages (3 Pages of English Translation and 4 Pages of Official Copy).
Office Action For Korean Application No. 10-2018-7032766, dated Sep. 29, 2021, 11 pages (6 pages of English Translation and 5 pages of Official copy).
Office Action for Korean Application No. 10-2021-7034839, dated Mar. 22, 2022, 11 pages (6 pages of English Translation and 5 pages of Official copy).
Office Action for Malaysian Application No. PI2018703432, dated Aug. 30, 2021, 4 pages.
Office Action received for Korean Patent Application No. 10-2018-7032766, dated Jul. 23, 2021, 6 pages (3 pages of English Translation and 3 pages of Official Copy Only).
Office Action received for Korean Patent Application No. 10-2019-0061281, dated Jun. 29, 2021, 12 pages (7 pages of English Translation and 5 pages of Official Copy Only).
Third Office Action received for Chinese Application No. 201780028361.9, dated Dec. 10, 2021, 15 pages (7 pages of English Translation and 8 pages of Official Copy).
Thorson, et al., Application and File History for U.S. Appl. No. 16/099,309, filed Nov. 6, 2018.

* cited by examiner

APPARATUS FOR RECEIVING SMOKABLE MATERIAL

RELATED APPLICATION

This application is a continuation of application Ser. No. 16/099,309 filed Nov. 6, 2018, which in turn is a National Phase entry of PCT Application No. PCT/EP2017/061523, filed May 12, 2017, which claims priority from U.S. Provisional Application No. 62/336,284, filed May 13, 2016, each of which is hereby fully incorporated herein by reference. Reference is made to U.S. Provisional Application No. 62/185,227, filed on Jun. 26, 2015, the entire contents of which are incorporated herein by reference.

TECHNICAL FIELD

The present disclosure relates to apparatus arranged to receive smokable material to enable at least one component of the smokable material to be volatilized.

BACKGROUND

Articles such as cigarettes, cigars and the like burn tobacco during use to create tobacco smoke. Attempts have been made to provide alternatives to these types of articles, which burn tobacco, by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine. Similarly, there are also so-called e-cigarette devices, which typically vaporize a liquid, which may or may not contain nicotine.

SUMMARY

According to the present disclosure, there is provided an apparatus for receiving smokable material to enable at least one component of the smokable material to be volatilized, the apparatus comprising: a housing; the housing having a first compartment and a second compartment; the first compartment being a heating compartment for receiving smokable material in use; the second compartment being an electronics compartment and containing at least one of control circuitry and a power source; the first compartment and the second compartment being substantially hermetically sealed from each other to minimize or prevent air or vapor flowing between the compartments.

In an exemplary embodiment, the apparatus comprises a divider wall between the first and second compartments. The divider wall may for example in part define one or both of the first and second compartments.

In an exemplary embodiment, the apparatus comprises at least one seal for sealing at least a portion of the divider wall to the housing.

In an exemplary embodiment, the housing comprises a chassis, the chassis comprising a recess; and the divider wall comprises at least one edge which is received in the recess of the chassis.

In an exemplary embodiment, the housing comprises an outer sleeve in which the chassis is arranged; and the chassis comprises a second recess, wherein at least a first seal is arranged in the second recess to provide a seal between the chassis and the outer sleeve.

In an exemplary embodiment, the divider wall comprises a groove for receiving a seal, wherein a seal is arranged in the groove to provide a seal between the divider wall and the chassis. In an example there may be a seal at one or both ends of the divider wall, and/or along one or both long edges of the divider wall. The seal is, e.g., a polymer, such as for example silicone. The groove for receiving a seal and the seal may be arranged in for example a tongue and groove arrangement.

In an exemplary embodiment, the apparatus comprises a heater in the first compartment for heating smokable material received in the first compartment in use. In an exemplary embodiment, the heater is tubular, having first and second ends and a hollow central portion providing a heating chamber in which smokable material is received in use, air being able to flow through one end of the tubular heater and out of the other end of the tubular heater.

In an exemplary embodiment, the heater has a heater tail which passes between the first and second compartments and which is connected to a power source within the second compartment to power the heater in use. In an exemplary embodiment, the heater tail passes through a seal between the first and second compartments. The seal may be made of a polymer, such as for example silicone.

In an exemplary embodiment, the housing has a first opening to a heating chamber through which smokable material can pass so as to be received within and removed from the heating chamber; the housing has a second opening to the heating chamber; and the housing comprises a door for selectively covering the second opening, the door being movable between a first position in which the second opening is closed by the door and a second position in which the second opening is open.

In some examples, the second opening allows a user to access the heating chamber through at least the second opening to clean within the apparatus, and the door seals that opening in use. In use in some examples, the smokable material seals the first opening when inserted into the apparatus.

In an exemplary embodiment, the apparatus comprises a heat insulator surrounding the heater for reducing heat loss from the heater to the exterior of the apparatus.

BRIEF DESCRIPTION OF THE DRAWINGS

Embodiments of the disclosure will now be described, by way of example only, with reference to the accompanying drawings, in which.

DETAILED DESCRIPTION

As used herein, the term "smokable material" includes materials that provide volatilized components upon heating, typically in the form of an aerosol. "Smokable material" includes any tobacco-containing material and may, for example, include one or more of tobacco, tobacco derivatives, expanded tobacco, reconstituted tobacco or tobacco substitutes. "Smokable material" also may include other, non-tobacco, products, which, depending on the product, may or may not contain nicotine. "Smokable material" may for example be in the form of a solid, a liquid, a gel or a wax or the like. "Smokable material" may for example also be a combination or a blend of materials.

Apparatus is known that heats smokable material to volatilize at least one component of the smokable material, typically to form an aerosol which can be inhaled, without burning or combusting the smokable material. Such apparatus is sometimes described as a "heat-not-burn" apparatus or a "tobacco heating product" or "tobacco heating device" or similar. Similarly, there are also so-called e-cigarette devices, which typically vaporize a smokable material in the form of a liquid, which may or may not contain nicotine. The smokable material may be in the form of or provided as part of a rod, cartridge or cassette or the like which can be inserted into the apparatus. A heater for heating and volatilizing the smokable material may be provided as a "permanent" part of the apparatus or may be provided as part of the smoking article or consumable which is discarded and replaced after use. A "smoking article" in this context is a device or article or other component that includes or contains in use the smokable material, which in use is heated to volatilize the smokable material, and optionally other components.

Figure 1:
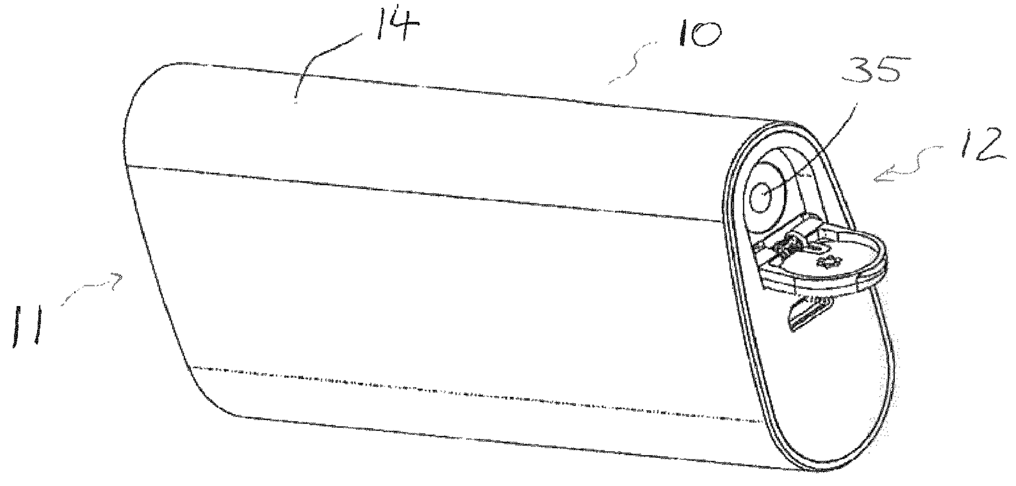
FIG. 1 shows a first perspective view of an example of an apparatus for heating smokable material.
Figure 2:
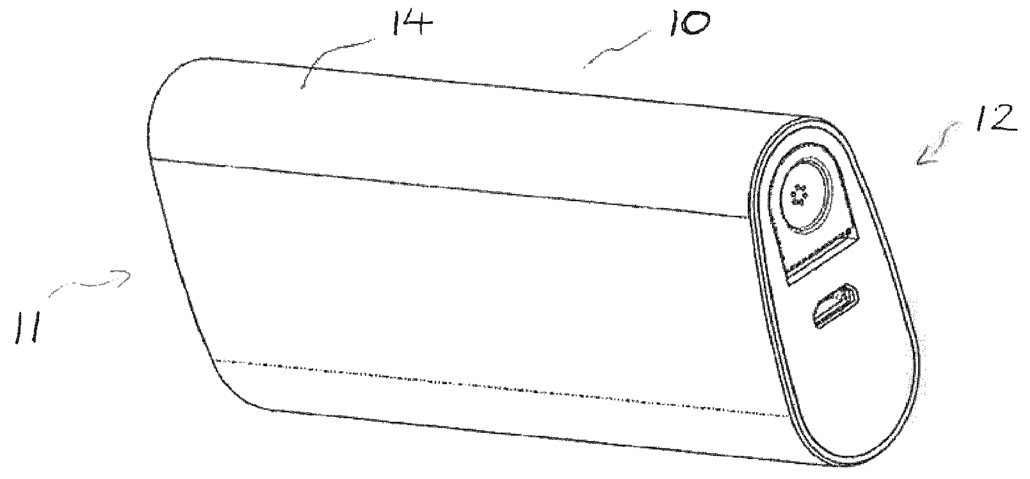
FIG. 2 shows a second perspective view of the apparatus of FIG. 1.
Figure 3:
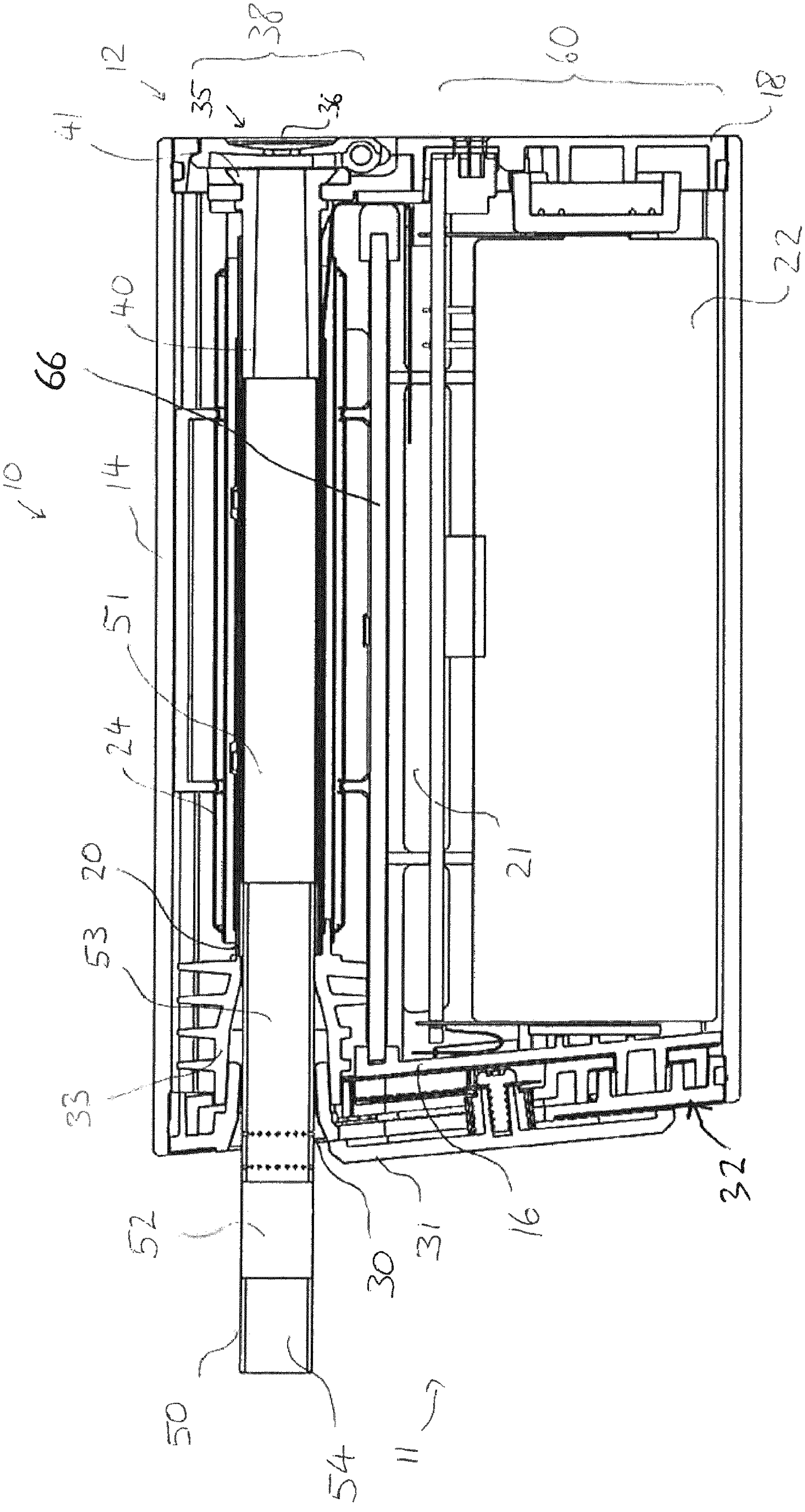
FIG. 3 shows a lateral cross-sectional view of the apparatus of FIG. 1 with smokable material inserted.
Figure 4:
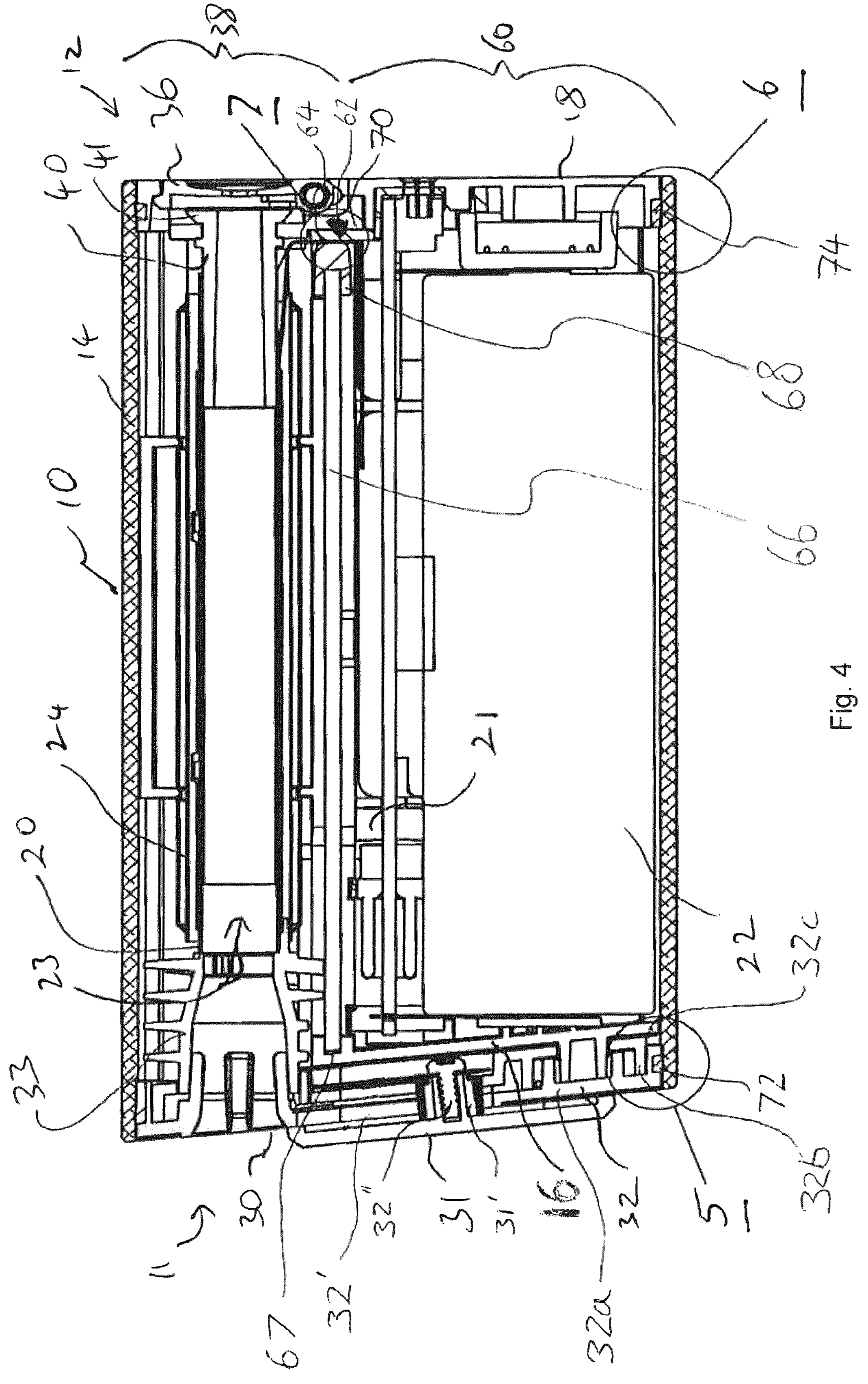
FIG. 4 shows a lateral cross-sectional view of the apparatus of FIG. 1 with no smokable material inserted.

Referring to FIGS. 1 to 4, there are shown views of an example of an apparatus 10 arranged to heat smokable material to volatilize at least one component of said smokable material, typically to form an aerosol which can be inhaled. FIG. 3 shows the apparatus 10 with smokable material inserted and FIG. 4 shows the apparatus 10 with no smokable material inserted. The apparatus 10 is a heating apparatus 10 which releases compounds by heating, but not burning, the smokable material. A first end 11 is sometimes referred to herein as the mouth or proximal end 11 and a second end 12 is sometimes referred to herein as the distal end 12. The apparatus 10 has an on/off button (not shown) to allow the apparatus 10 as a whole to be switched on and off as desired by a user.

The apparatus 10 provides a housing for locating and protecting various internal components of the apparatus 10. In the example shown, the apparatus 10 is formed of one or more internal "chassis" parts and one or more external sleeve parts. In the particular example shown here, the apparatus 10 has a single, unitary external sleeve or housing 14 and an internal chassis 16. In a specific example, the internal chassis 16 may be formed of two chassis halves, and optionally other chassis parts. During assembly of the apparatus 10, various internal components of the apparatus 10 are located in and/or fixed to the chassis 16 and then the internal components and chassis or chassis parts 16 are slid inside the housing 14. The chassis or chassis parts 16 may be removably fixed to the housing 14, to permit easy access to the interior of the apparatus 10, or may be "permanently" fixed to the chassis 16, for example to deter a user from accessing the interior of the apparatus 10. In the particular example shown here, the chassis 16 provides or supports at least in part a front wall of the apparatus 10 at the first or mouth end 11 and also provides at least in part a rear wall 18 of the apparatus at the second or distal end 12. In an example the chassis 16 is made of a plastics material, including for example glass-filled nylon formed by injection molding, though other materials and other manufacturing processes may be used.

The housing 14 has located or fixed therein a heater 20, control circuitry 21 and a power source 22. In this example, the heater 20, the control circuitry 21 and the power source 22 are laterally adjacent (that is, adjacent when viewed from an end), with the control circuitry 21 being located generally between the heater 20 and the power source 22, though other locations are possible. The control circuitry 21 may include a controller, such as a microprocessor arrangement, configured and arranged to control the heating of the smokable material as discussed further below. The power source 22 may be for example a battery, which may be a rechargeable battery or a non-rechargeable battery. Examples of suitable batteries include for example a lithium-ion battery, a nickel battery (such as a nickel-cadmium battery), an alkaline battery and/or the like. The battery 22 is electrically coupled to the heater 20 to supply electrical power when required and under control of the control circuitry 21 to heat the smokable material (as discussed, to volatilize the smokable material without causing the smokable material to burn). An advantage of locating the power source 22 laterally adjacent to the heater 20 is that a physically large power source 22 may be used without causing the apparatus 20 as a whole to be unduly lengthy. As will be understood, in general a physically large power source 22 has a higher capacity (that is, the total electrical energy that can be supplied, often measured in Amp-hours or the like) and thus the battery life for the apparatus 10 can be longer.

In one example, the heater 20 is generally in the form of a hollow cylindrical tube, having a hollow interior heating chamber 23 into which smokable material is inserted for heating in use. Different arrangements for the heater 20 are possible. For example, the heater 20 may be formed as a single heater or may be formed of plural heaters aligned along the longitudinal axis of the heater 20. (For simplicity, reference to a "heater" herein shall be taken to include plural heaters, unless the context requires otherwise.) The heater 20 may be annular or tubular, or at least part-annular or part-tubular around its circumference. In an example, the heater 20 may be a thin film heater. In one particular example, the heater 20 is supported by a stainless steel support tube. The heater 20 is dimensioned so that substantially the whole of the smokable material when inserted is located within the heating element(s) of the heater 20 so that substantially the whole of the smokable material is heated in use. The heater 20 may be arranged so that selected zones of the smokable material can be independently heated, for example in turn (over time) or together (simultaneously) as desired.

The heater 20 in this example is surrounded along at least part of its length by a thermal insulator 24. The insulator 24 helps to reduce heat passing from the heater 20 to the exterior of the apparatus 10. This helps to keep down the power requirements for the heater 20 as it reduces heat losses generally. The insulator 24 also helps to keep the exterior of the apparatus 10 cool during operation of the heater 20. In one example, the insulator 24 may be a double-walled sleeve which provides a low pressure region between the two walls of the sleeve. That is, the insulator 24 may be for example a "vacuum" tube, i.e. a tube that has been at least partially evacuated so as to minimize heat transfer by conduction and/or convection. Other arrangements for the insulator 24 are possible, including using heat insulating materials, including for example a suitable foam-type material, in addition to or instead of a double-walled sleeve.

The front of the chassis 16 has an opening 30 at the mouth end 11 of the apparatus 10 through which smokable material in use may be passed to be inserted into the apparatus 10 and removed from the apparatus 10 by a user. A door 31 is provided at the mouth end 11. The door 31 can be opened so as to allow smokable material to be passed through the opening 30 to be inserted into and removed from the apparatus 10 during periods of use and can be closed to close the opening 30 to keep the interior of the apparatus 10 clean during periods of non-use and avoiding damage to the interior of the apparatus 10. The door 31 in this example is a sliding door, which can be slid up and down to close and open the opening 30. In other examples, the door 31 may be a hinged door or other arrangements may be provided. The door 31 in this example is provided in conjunction with a front component 32.

The front component 32 has at least one part. In the specific example shown the front component 32 has three parts, a front part 32*a*, an intermediate part 32*b* and a rear part 32*c*. The intermediate part 32*b* may be secured to the rear part 32*c* for example adhesive, including for example double-sided adhesive tape.

The front door 31 of the apparatus 10 is constructed and arranged to be slidably connected to the front component 32. The front door 31 may be slidably fitted to the front component 32 by a projection and recess combination. The front door 31 in the example shown has a rearwards facing projection 31' which is received in a recess or channel 32' in the front component 32. The front door 31 may be secured using a screw 32" which nevertheless allows the front door 31 to slide up and down in the channel 32'.

Referring here particularly to FIG. 3, this shows a rod 50 which includes smokable material 51 inserted partly through the front opening 30 so that (at least) the smokable material 51 is located within the heating chamber 23 of the heater 20 so that the smokable material 51 is heated when the heater 20 is energized. In this example, the rod 50 has at the mouth end a mouthpiece assembly which includes one or more of a filter for filtering aerosol and/or a cooling element 52 for cooling aerosol. The filter/cooling element 52 is spaced from the smokable material by a space 53 and is also spaced from the mouth end of the rod 50 by a further space 54.

The rear wall 18 of the housing 14 has an opening 35 at the distal end 12 of the apparatus 10. A door 36 is provided at the distal end 12. The door 36 can be opened so as to allow access to the opening 35 at the distal end 12 and can be closed to close the opening 35 at the distal end 12. The door 36 at the distal end 12 in this example is a hinged door. In other examples, the door 36 may be a sliding door or other arrangements may be provided. In the case that the door 36 at the distal end 12 is a hinged door, the hinge may be provided as a "living hinge". In some embodiments, the door 36 is a separate component and the hinge for the door 36 is a barrel hinge.

In the assembled apparatus 10, the heater 20 is generally in the form of a hollow cylindrical tube is located within the chassis 16 so that one end of the hollow tube is in fluid communication with the opening 30 at the mouth end 11 and the other end of the hollow tube is in communication with the opening 35 at the distal end.

In use, the user closes the door 36 at the distal end 12 to close the opening 35 at the distal end 12 and opens the door 30 at the mouth end 11 to open the opening 30 at the mouth end 11. The user then inserts the rod 50 that includes smokable material 51 through the opening 30 at the mouth end 11 into the heating chamber 23 of the heater 20, operates the apparatus 10 to heat the smokable material 51 to generate an aerosol for inhaling as desired, and then removes the rod 50 with used smokable material 51 from the apparatus 10 through the opening 30 at the mouth end 11. The user can open the door 36 at the distal end 12 to open the opening 35 at the distal end 12 after the apparatus 10 has been used. The opening 35 at the distal end 12 provides access for the user to the interior of the apparatus 10, particularly in the region of the opening 35 at the distal end 12. This allows the user to clean within the interior of the apparatus 10 in the region of the opening 35 at the distal end 12 when necessary and as desired. This access at the distal end 12 particularly enables the user to clean within the heater 20 and the heating chamber 23 at the distal end 12. Indeed, as the heater 20 is located between the openings 30, 35 at the mouth end 11 and the distal end 12 respectively, and the hollow heater 20 in effect defines a straight through-bore through the whole apparatus 10 between the mouth end opening 30 and the distal end opening 35, the user is easily able to clean through substantially the whole of the interior hollow heating chamber 23. For this, the user can access the heating chamber 23 via either opening 30, 35 at choice. The user may use one or more various cleaning devices for this purpose, including for example a classic pipe cleaner or a brush or the like.

In an example, the heating chamber 23 has a region of reduced internal diameter towards the distal end 12. This provides an end stop for smokable material passed through the first opening 30 at the mouth end 11, to prevent the smokable material being passed straight out through the second opening 35 at the distal end 12. In the example shown, this region of reduced internal diameter is provided by a hollow tube 40 which is located within the end of the heating chamber 23 towards the distal end 12. The hollow tube 40 in this example has an outwardly extending head or flange 41. The hollow tube 40 may be formed of for example a plastics material, including for example polyether ether ketone (PEEK). The hollow tube 40 may be fixed in place, for example by glue or a twist-lock mechanism.

During manufacture of the apparatus 10, the hollow tube 40 is inserted from the outside into the opening 35 at the distal end 12, with the head or flange 41 providing a stop against the chassis 16 to locate the hollow tube 40 at the predetermined position. The heater 20 is located within the chassis 16, with the hollow tube 40 entering the distal end of the interior chamber 23 of the heater 20. Accordingly, in this case, the hollow tube 40 provides the region of reduced internal diameter within the heating chamber 23 which acts as a stop for the smokable material inserted into the interior chamber 23 of the heater 20, and also supports and locates the heater 20 within the apparatus 10 at the distal end 12. Discussing further the support and location of the heater 20 within the apparatus 10, a tubular mouthpiece component 33 is provided at the mouth end 11 and supports and locates the front end of the heater 20.

It has been found that an important requirement for the apparatus 10 is for the airflow through the interior chamber 23 of the heater 20 to be isolated from the remainder of the apparatus 10, or least substantially isolated. This is so as to prevent or least minimize contamination of the airflow through the interior chamber 23 of the heater 20 by air that has passed over the control circuitry 21 and/or the power source 22, etc. Likewise, this is so as to prevent or least minimize the airflow through the interior chamber 23 of the heater 20 passing to or over the control circuitry 21 and/or the power source 22, etc.

Referring to FIGS. 3 and 4, the heater 20 in an apparatus for heating smokable material, including for example an apparatus 10 as described above, may be formed from a sheet, that is, a generally planar sheet of material, which is rolled and sealed along the length of the tube. The rolled heater 20 may have a tubular shape with first and second ends and a hollow central portion. The hollow central portion may receive smokable material in use. Smokable material is inserted into the hollow central portion through one of the first and second ends. The tube is sealed along its full length and, as such, air is prevented from entering or leaving the heater other than by one or more of the first or second ends. The tube may be sealed using for example adhesive, or specifically pressure-sensitive adhesive. The heater 20 in a specific example is a thin-film heater.

The tubular heater 20 may be made of a substrate with at least one electrically conductive track formed on the substrate. The substrate may be in the form of a sheet and may comprise for example a plastics layer. In a specific example the layer is a polyimide layer. The electrically conductive track may be printed, or otherwise deposited, onto the layer. The tubular heater 20 may have a further plastics layer formed on or over the electrically conductive track. In this example the electrically conductive track is therefore between two plastics layers.

Referring further to FIGS. 3 and 4, the tubular heater 20 is located in a first compartment 38, which may be termed a heating compartment of the apparatus 10. The apparatus 10 may also have a second compartment 60, which may be termed an electronics compartment 60, which contains at least one of the control circuitry 21 and the power source 22. In the example shown in FIGS. 3 and 4, the electronics compartment 60 contains both the control circuitry 21 and the power source 22. The first, heating compartment 38 may be isolated from the second, electronics compartment 60 so that the two compartments 38, 60 are substantially hermetically sealed from each other, to minimize or prevent air or vapor passing between the compartments 38, 60. The hermetic seal or isolation of the compartments 38, 60 may be such that at most only a negligible amount of air flows between the compartments 38, 60. In a specific example the isolation of the compartments 38, 60 is such that the amount of air or vapor passing between the compartments 38, 60 is less than approximately 1% of the total air flow through the heating chamber 23, and ideally is none. (It will be seen that there is a passageway 62 between the compartments 38, 60 through which a heater tail 64 passes. The heater tail 64 connects the heater 20 to the control circuitry 21 and the power source 22 in the electronics compartment 60. This will be discussed further below.)

Referring still to FIGS. 3 and 4, the apparatus 10 in this example has a divider wall 66 between the first, heating compartment 38 and the second, electronics compartment 60. The divider wall 66 may be a separate component or may be integrally formed with the chassis or chassis parts 16. In the example shown, the divider wall 66 is arranged between the front of the apparatus 10 and the rear wall 18 of the apparatus 10. The divider wall 66 may in part define one or both of the first, heating compartment 38 and the second, electronics compartment 60. The divider wall 66 may be made of thermoplastics such as acrylonitrile butadiene styrene (ABS) as the divider wall 66 may experience indirect heating from the heater 20 and needs to resist that heat. The divider wall 66 may be overmolded with a sealing material, such as for example thermoplastic polyurethane (TPU), to seal the air path from the electronics on the outside of the chassis 16.

The front edge of the divider wall 66 in the example shown is received in a recess 67 in the chassis 16, in a "tongue and groove" arrangement, for ease of construction and assembly of the apparatus 10. The rear edge of the divider wall 66 in the example shown is received in a seal 68, again in a tongue and groove arrangement in this example. The seal 68 in which the divider wall 66 is received is a resilient member. The seal 68 may be made of, for example, one or more polymers such as silicone or rubber, and may be in the form of a grommet or cap which may be injection molded for example. In other examples not shown, the front edge of the divider wall 66 may also be received in a seal similar to the seal 68 for the rear edge.

Figure 5:
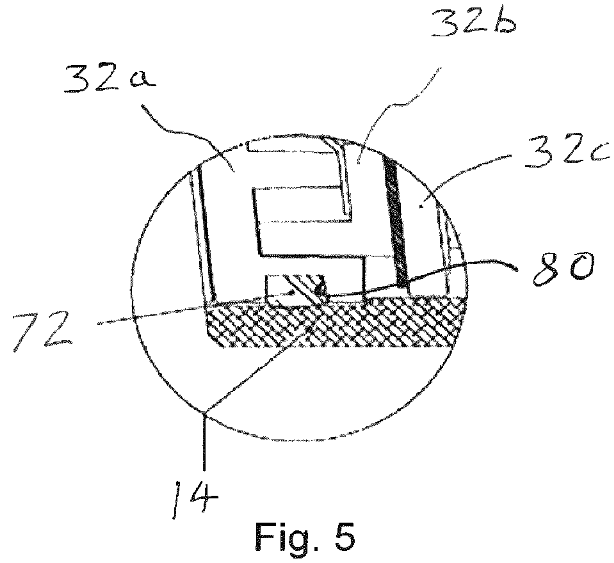
FIG. 5 shows a detailed inset view of the region labeled "5" in FIG. 4.
Figure 6:
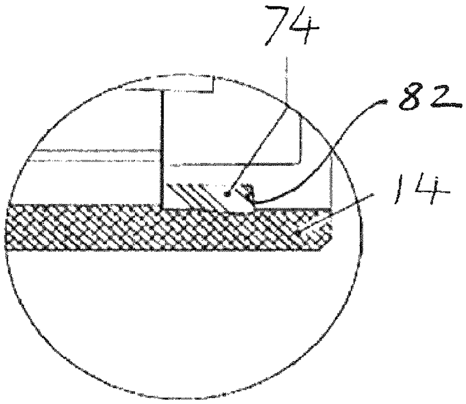
FIG. 6 shows a detailed inset view of the region labeled "6" in FIG. 4.
Figure 7:
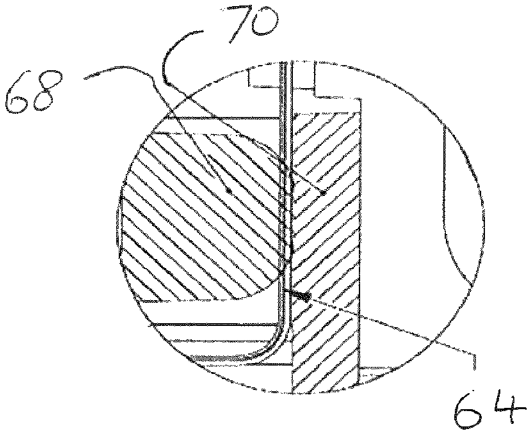
FIG. 7 shows a detailed inset view of the region labeled "7" in FIG. 4.

Referring now to FIGS. 5 to 7, there are shown detailed inset views of specific regions of the apparatus 10 shown in FIG. 4. Each of FIGS. 5 to 7 displays at least one seal within the apparatus 10 which assists in provided a substantially hermetic seal between the heating compartment 38 and the electronics compartment 60. It will be understood that the specific examples show a number of seals, and that not all of these seals may be present in embodiments. That is, some embodiments may only have one of the seals described herein, or more than one of the seals described herein, or all of the seals described herein.

FIG. 5 shows a seal 72 between the housing 14 of the apparatus 10 and the front part 32*a* of the front component 32. The seal 72 sits in a groove or recess 80 provided in one or both of the front part 32' of the front component 32 and the housing 14. The seal 72 can be compressed to ensure a tight fit between the housing 14 and the front component 32. The seal 72 is a resilient member. The seal 72 may be made of, for example, one or more polymers, including for example silicone or rubber. The seal 72 may be overmolded with a sealing material, such as for example thermoplastic polyurethane.

FIG. 6 shows a seal 74 between the housing 14 of the apparatus 10 and the rear wall 18. The seal 74 sits in a groove or recess 82 provided in one or both of the rear wall 18 and the housing 14. The seal 74 can be compressed to ensure a tight fit between the housing 14 and the rear wall 18. The seal 74 is a resilient member. The seal 74 may be made of, for example, one or more polymers, including for example silicone or rubber. The seal 74 may be overmolded with a sealing material, such as for example thermoplastic polyurethane.

FIG. 7 shows the seal 68 in which the second end of the divider wall 66 is received. FIG. 7 also shows a seal 70 arranged opposite the seal 68 in which the second end of the divider wall 66 is received. The two seals 68, 70 shown are arranged between the first compartment 38 and the second compartment 60. The seals 68, 70 are arranged to be pressing against one another such that the seal between the seals 68, 70 is substantially hermetic. The seal 70 in this example is a resilient member. The seal 70 may be made of, for example, one or more polymers such as silicone or rubber.

As mentioned, in the example shown there is a passageway 62 between the compartments 38, 60, through which a tail 64 of the heater 20 passes to allow the heater 20 to be connected to at least the power supply 22. In the example shown, the heater tail 64 connects the heater 20 to the control circuitry 21 and the power source 22 in the electronics compartment 60.

FIG. 7 shows an enlarged view of region around the passageway 62 between the compartments 38, 60. The heating tail 64 occupies the passageway 62. The heating tail 64 is arranged between the seal 68 in which the second end of the divider wall 66 is received and the seal 70 arranged opposite the seal 68 in which the second end of the divider wall 66 is received. The seal 68, 70 are compressed against the heating tail 64 to maintain the substantially hermetic seal between the compartments 38, 60.

Figure 8:
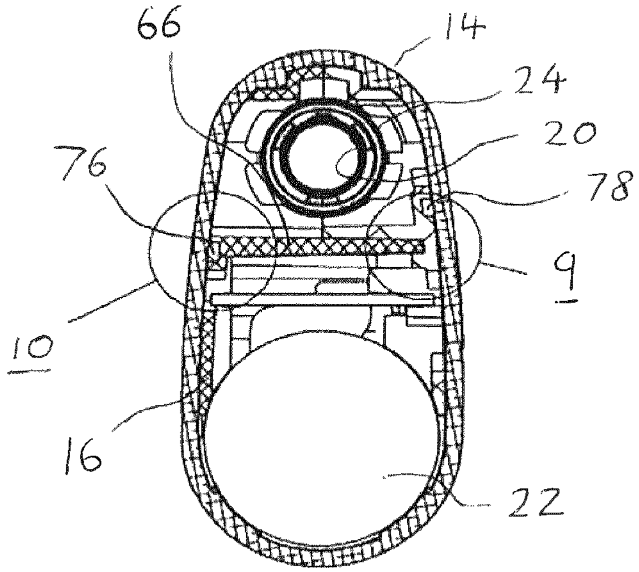
FIG. 8 shows a longitudinal cross-sectional view of the apparatus of FIG. 1.
Figure 9:
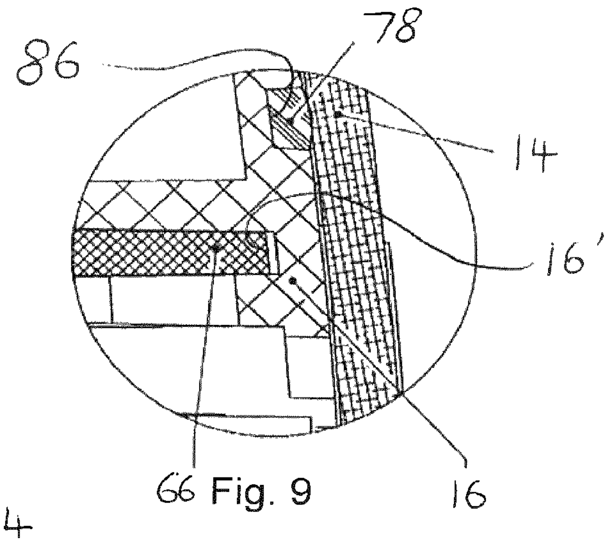
FIG. 9 shows a detailed inset view of the region labeled "9" in FIG. 4.
Figure 10:
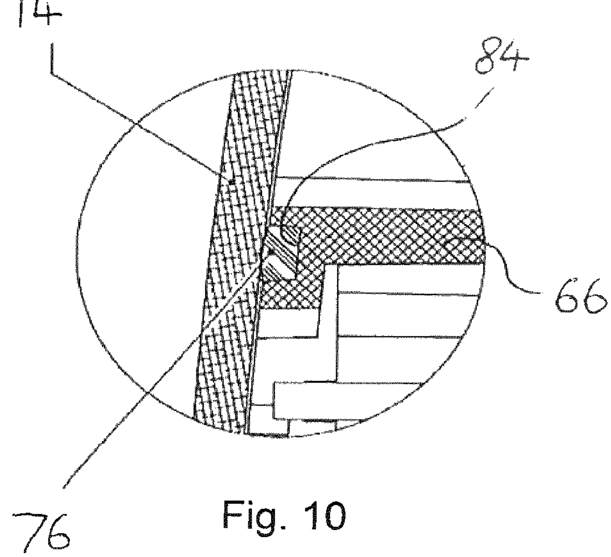
FIG. 10 shows a detailed inset view of the region labeled "10" in FIG. 4.

FIG. 8 shows a longitudinal cross-sectional view of the apparatus 10. FIGS. 9 and 10 show detailed inset views of two regions of the apparatus 10 shown in FIG. 8.

Referring to FIGS. 8 to 10, the divider wall 66 is shown arranged between the chassis 16 of the apparatus 10. The divider wall 66 along a first edge is received in a recess 16' in the chassis 16 of the apparatus 10 in a tongue and groove arrangement. The first edge of the divider wall 66 may be secured within the recess 16' of the chassis 16 by, for example, an adhesive or simply as a force fit or friction fit.

The divider wall 66 shown has a groove 84 along the second edge of the divider wall 66. A seal 76 is arranged in the groove 84 of the divider wall 66. The seal 76 abuts the chassis 16 of the apparatus 10. The seal 76 and groove 84 arrangement is such that a substantially hermetic seal is formed along the second edge of the divider wall 66. The seal 76 is a resilient member. The seal 76 may be made of, for example, one or more polymers such as silicone or rubber. The seal 76 may be overmolded with a sealing material, such as for example thermoplastic polyurethane in groove 84.

Referring now to FIG. 9 in particular, there is shown a detailed inset view of a region of the apparatus 10 shown in FIG. 8. There is a further seal 78 between the housing of the apparatus and the side panel for providing an external seal between the air path and electronics. The further seal 78 is located in a groove 86 and is overmolded with a sealing material, such as for example thermoplastic polyurethane, which is compressed between the housing 14 and the chassis 16.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An apparatus for receiving smokable material to enable at least one component of the smokable material to be volatilized, the apparatus comprising:

a housing, the housing having a first compartment and a second compartment, the first compartment being a heating compartment for receiving smokable material in use, and the second compartment being an electronics compartment and containing at least one of control circuitry or a power source, the first compartment and the second compartment being hermetically sealed from each other to minimize or prevent air or vapor flowing between the first compartment and the second compartment;

a divider wall between the first compartment and the second compartment, and at least one seal for sealing at least a portion of the divider wall to the housing; and a heater in the first compartment for heating smokable material received in the first compartment in use, wherein the heater has a heater tail which passes between the first compartment and the second compartment and which is connected to a power source within the second compartment to power the heater in use, and wherein the heater tail passes through a seal between the first compartment and the second compartment.

2. The apparatus according to claim 1, wherein:

the housing comprises a chassis, the chassis comprising a first recess; and the divider wall comprises at least one edge which is received in the first recess of the chassis.

3. The apparatus to claim 2, wherein:

the housing comprises an outer sleeve in which the chassis is arranged; and the chassis comprises a second recess, wherein at least a first seal is arranged in the second recess to provide a seal between the chassis and the outer sleeve.

4. The apparatus according to claim 1, wherein the housing comprises a chassis, wherein the divider wall comprises a groove for receiving a seal, wherein a seal is arranged in the groove to provide a seal between the divider wall and the chassis.

5. The apparatus according to claim 1, wherein the heater is tubular, having a first end and a second end and a hollow central portion providing a heating chamber in which smokable material is received in use, air being able to flow through one end of the tubular heater and out of the other end of the tubular heater.

6. The apparatus according to claim 1, wherein:

the housing has a first opening to a heating chamber through which smokable material can pass so as to be received within and removed from the heating chamber;

the housing has a second opening to the heating chamber; and the housing comprises a door for selectively covering the second opening, the door being movable between a first position in which the second opening is closed by the door and a second position in which the second opening is open.

7. The apparatus according to claim 1, further comprising a heat insulator surrounding the heater for reducing heat loss from the heater to an exterior of the apparatus.

* * * * *